(12) United States Patent
Spagnoli et al.

(10) Patent No.: US 11,155,186 B2
(45) Date of Patent: Oct. 26, 2021

(54) SLIDING DEVICE FOR A VEHICLE SEAT PROVIDED WITH AN IMPROVED RELEASING ASSEMBLY

(71) Applicant: MARTUR ITALY S.R.L., Milan (IT)

(72) Inventors: Luigi Spagnoli, Grugliasco (IT); Can Üstünberk, Grugliasco (IT)

(73) Assignee: MARTUR ITALY S.R.L., Milan (IT)

( * ) Notice: Subject to any disclaimer, the term of this patent is extended or adjusted under 35 U.S.C. 154(b) by 0 days.

(21) Appl. No.: 16/619,355

(22) PCT Filed: Apr. 17, 2019

(86) PCT No.: PCT/IB2019/053189
§ 371 (c)(1),
(2) Date: Dec. 4, 2019

(87) PCT Pub. No.: WO2020/016665
PCT Pub. Date: Jan. 23, 2020

(65) Prior Publication Data
US 2021/0053469 A1 Feb. 25, 2021

(30) Foreign Application Priority Data
Jul. 19, 2018 (IT) .......................... 102018000007333

(51) Int. Cl.
*B60N 2/08* (2006.01)
(52) U.S. Cl.
CPC ......... *B60N 2/0887* (2013.01); *B60N 2/0806* (2013.01); *B60N 2/0818* (2013.01); *B60N 2/0875* (2013.01)
(58) Field of Classification Search
CPC .. B60N 2/0806; B60N 2/0881; B60N 2/0887; B60N 2/0812; B60N 2/0818;
(Continued)

(56) References Cited

U.S. PATENT DOCUMENTS 5,273,241 A * 12/1993 Droulon ................. B60N 2/123
248/429
5,918,846 A * 7/1999 Garrido ................. B60N 2/123
248/424
(Continued)

FOREIGN PATENT DOCUMENTS

CN 101942941 A 1/2011
CN 102673435 A 9/2012
(Continued)

OTHER PUBLICATIONS

International Search Report and Written Opinion of the International Searching Authority dated Aug. 20, 2019 for International Patent Application No. PCT/IB2019/053189.

*Primary Examiner* — Jonathan Liu
*Assistant Examiner* — Guang H Guan
(74) *Attorney, Agent, or Firm* — Howson & Howson LLP

(57) ABSTRACT

A sliding device for a vehicle seat is provided with a pair of tracks and an improved releasing assembly. The sliding device comprises a pair of locking assemblies, one for each track, each including a plurality of locking pins for locking upper rails of the tracks to lower rails of the tracks. The sliding device further includes a releasing assembly for driving the locking pins to an unlocking configuration for adjusting the position of the vehicle seat. The releasing assembly comprises a releasing member having a pair of substantially parallel arms pivotally connected to the tracks, a crossbar extending transversely to the tracks and provided at each end with an engaging assembly for engaging the locking pins of the respective locking assembly, and a pair of connecting members configured to convert a rotational movement of end portions of the arms into a translational movement of the crossbar.

14 Claims, 7 Drawing Sheets

(58) Field of Classification Search
CPC .. B60N 2/0831; B60N 2/0837; B60N 2/0862; B60N 2/0875; B60N 2/0893
See application file for complete search history.

(56) References Cited

U.S. PATENT DOCUMENTS

| | | | | |
|---|---|---|---|---|
| 6,036,157 | A * | 3/2000 | Baroin | B60N 2/0705 248/429 |
| 6,126,133 | A * | 10/2000 | Timon | B60N 2/0705 248/429 |
| 6,227,596 | B1 * | 5/2001 | Foucault | B60N 2/123 296/65.13 |
| 6,231,022 | B1 * | 5/2001 | Becker | B60N 2/0705 248/429 |
| 6,254,188 | B1 * | 7/2001 | Downey | B60N 2/123 248/430 |
| 6,328,272 | B1 * | 12/2001 | Hayakawa | B60N 2/071 248/429 |
| 6,637,712 | B1 | 10/2003 | Lagerweij | |
| 6,669,284 | B2 * | 12/2003 | Feichtinger | B60N 2/0705 248/429 |
| 6,695,275 | B2 * | 2/2004 | Schuler | B60N 2/0705 248/424 |
| 6,772,985 | B2 * | 8/2004 | Lee | B60N 2/071 248/424 |
| 6,874,747 | B2 * | 4/2005 | Oh | B60N 2/0705 248/424 |
| 6,902,235 | B2 * | 6/2005 | Rohee | B60N 2/08 248/424 |
| 7,150,441 | B2 * | 12/2006 | Leguede | B60N 2/08 248/423 |
| 7,172,249 | B2 * | 2/2007 | Rausch | B60N 2/123 297/341 |
| 7,191,995 | B2 * | 3/2007 | Kim | B60N 2/0705 248/429 |
| 7,207,541 | B2 * | 4/2007 | Frohnhaus | B60N 2/0705 248/424 |
| 7,669,825 | B2 * | 3/2010 | Sung | B60N 2/0825 248/429 |
| 7,980,525 | B2 | 7/2011 | Kostin | |
| 8,382,057 | B2 * | 2/2013 | Napau | B60N 2/0881 248/423 |
| 8,387,936 | B2 * | 3/2013 | Tarusawa | B60N 2/0806 248/429 |
| 8,469,328 | B2 | 6/2013 | Nakamura et al. | |
| 8,800,948 | B2 * | 8/2014 | Wakayama | B60N 2/0806 248/429 |
| 8,827,229 | B2 * | 9/2014 | Wakayama | B60N 2/0893 248/429 |
| 9,272,639 | B2 | 3/2016 | Lee et al. | |
| 9,481,266 | B2 * | 11/2016 | Kim | B60N 2/0806 |
| 9,604,551 | B2 * | 3/2017 | Kim | B60N 2/0875 |
| 10,214,119 | B2 * | 2/2019 | Stutika | B60N 2/0818 |
| 10,744,907 | B2 * | 8/2020 | Kim | B60N 2/0881 |
| 11,027,629 | B2 * | 6/2021 | Krpo | B60N 2/0875 |
| 2003/0006355 | A1 | 1/2003 | Horsfield | |
| 2020/0391619 | A1 | 12/2020 | Krpo et al. | |
| 2020/0391620 | A1 | 12/2020 | Krpo et al. | |
| 2020/0398704 | A1 * | 12/2020 | Krpo | B60N 2/0818 |
| 2020/0406785 | A1 | 12/2020 | Krpo et al. | |
| 2021/0046851 | A1 | 2/2021 | Spagnoli et al. | |
| 2021/0053469 | A1 * | 2/2021 | Spagnoli | B60N 2/0806 |
| 2021/0245632 | A1 * | 8/2021 | Spagnoli | B60N 2/0715 |

FOREIGN PATENT DOCUMENTS

| | | | |
|---|---|---|---|
| CN | 104590060 A | 5/2015 | |
| CN | 107009919 A | 8/2017 | |
| DE | 102004047251 A1 * | 4/2006 | B60N 2/0875 |
| DE | 10 2013 218 868 A1 | 3/2015 | |
| FR | 3009245 A1 * | 2/2015 | B60N 2/0881 |
| KR | 10-2011-0133689 A | 12/2011 | |
| KR | 2011-0133689 A | 12/2011 | |
| KR | 101382711 B1 | 4/2014 | |
| KR | 2018-0024798 A | 3/2018 | |
| RU | 2174920 C2 | 10/2001 | |

* cited by examiner

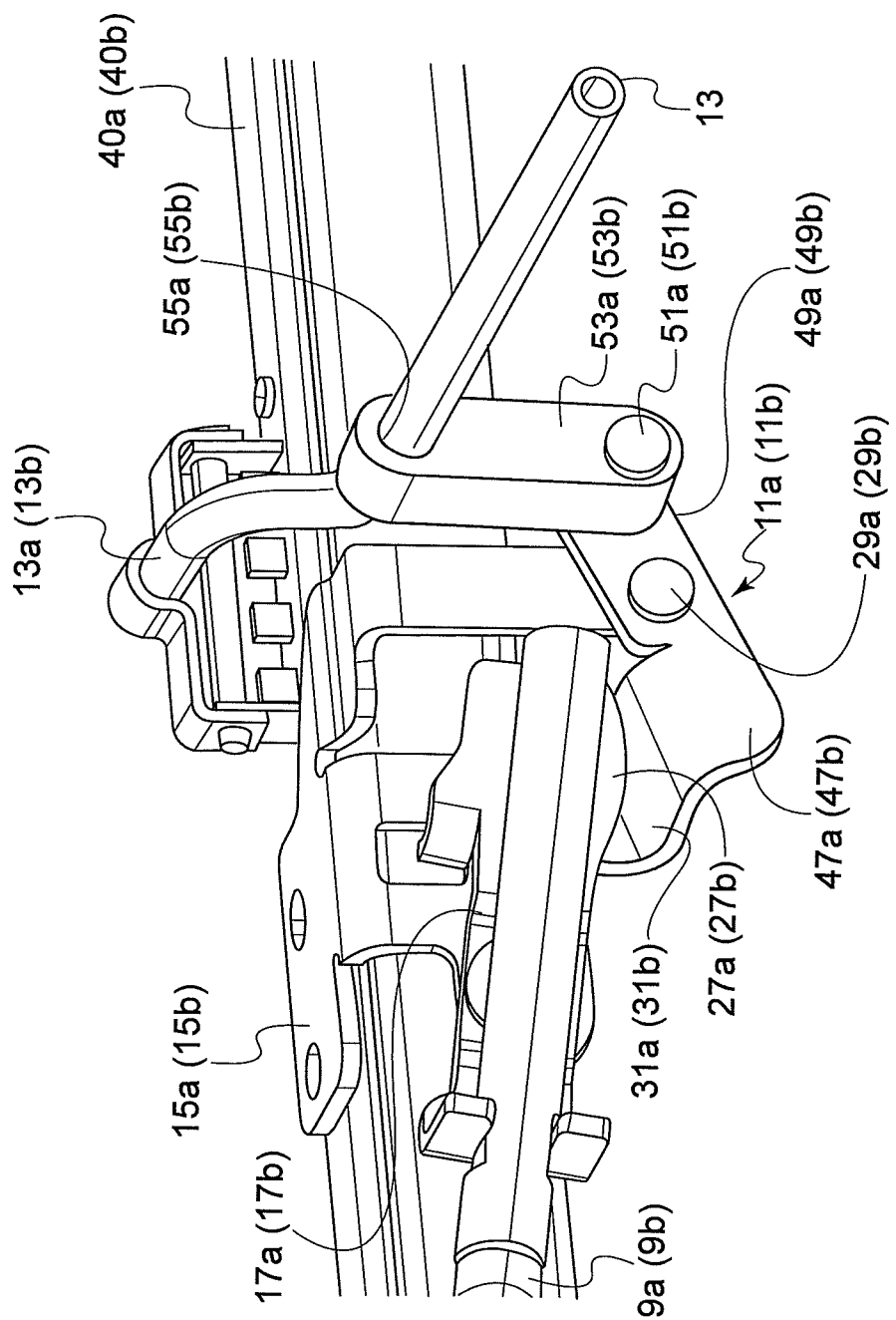

SLIDING DEVICE FOR A VEHICLE SEAT PROVIDED WITH AN IMPROVED RELEASING ASSEMBLY

TECHNICAL FIELD OF THE INVENTION

The present invention relates to a sliding device for a vehicle seat provided with an improved releasing assembly.

More particularly, the present invention relates to a sliding device for a vehicle seat provided with a releasing assembly having a compact construction and an improved reliability.

PRIOR ART

Vehicle seats generally have a sliding function for pushing or pulling the seat cushion in a forward or backward direction, a height adjustment function for adjusting the height of the seat cushion and a reclining function for adjusting the inclination of the seat backrest relative to the seat cushion.

The aforesaid sliding function is generally implemented by a sliding device which comprise a pair of parallel tracks, each of which comprises a lower rail attached to the vehicle floor and an upper rail attached to the vehicle seat, the upper rail being constrained to the lower rail, but being able to slide relative to said lower rail.

The sliding device further comprises a locking arrangement for allowing/preventing a movement of the upper rails relative to the lower rails. Such locking arrangement is normally in a locking configuration, in which it prevents the upper rails from sliding with respect to the lower rails, thus avoiding accidental displacements of the seat with respect to the vehicle floor.

Such locking arrangement normally comprises a pair of locking assemblies, one for each track.

The sliding device is further provided with a releasing assembly which can be used by a user for moving the locking assemblies of the locking arrangement to an unlocking configuration, in which the upper rails are free to move relative to the lower rails, so that the position of the seat with respect to the vehicle floor can be adjusted. Such releasing assembly comprises a releasing member, which can be made, for instance, as a "U"-shaped handle or towel bar having two substantially parallel arms, the end portions of which are configured to simultaneously act upon corresponding connecting members, which—in turn—act upon respective locking assemblies for driving them to their unlocking configuration.

Sliding devices are known from the art in which, in order to provide a positive engagement between the upper and lower rails, the lower rail of each track is provided with a series of apertures, aligned and preferably equally spaced from one another along the longitudinal axis of said lower rail, and each locking assembly is connected to the respective upper rail and comprises one or more locking pins configured to penetrate into respective apertures of the lower rail and engage with the edge of said apertures.

Preferably, several locking pins are provided and the size of said locking pins, the distance between said locking pins, the size of the apertures in the lower rails and the distance between said apertures are chosen so that at least one locking pin is always aligned with a corresponding aperture, so that it can penetrate into said aperture and engage the edge thereof.

Most preferably, the size of said locking pins, the distance between said locking pins, the size of the apertures in the lower rails and the distance between said apertures are chosen so that at least a first locking pin is positioned so as to penetrate into a corresponding aperture and engage the forward side of the edge thereof and at least a second locking pin is positioned so as to penetrate into a corresponding window and engage the rearward side of the edge thereof, whereby a "chuckless" engagement is obtained.

Such locking pins are normally biased, e.g. by means of springs, to a locking configuration, in which at least some of them engage respective apertures of the lower rails.

In order to move the locking assemblies to their unlocking configuration for adjusting the position of the vehicle seat with respect to the vehicle floor, a releasing member—such as a releasing towel bar or handle—is provided, which acts upon respective connecting members, one for each locking assembly: said connecting members, in turn, act upon the locking pins of the respective locking assembly for moving them to an unlocking configuration, in which they are disengaged from the apertures of the respective lower rail. To this purpose, the locking pins are generally provided with an enlarged head and the connecting members are provided with fork-shaped elements adapted to engage the pin heads for extracting said pins from the apertures of the lower rails.

Such locking arrangements for a sliding device for vehicle seats are disclosed, for instance, in documents US 2003/006355, U.S. Pat. Nos. 7,980,525 and 6,637,712.

However, a locking arrangement of the kind disclosed in the aforesaid documents is not free from drawbacks.

More particularly, in the known locking arrangements the releasing member is designed for making the connecting members rotate about a pivoting axis in order to move the locking pins from the locking configuration to the unlocking configuration: upon rotation of the connecting members, the fork-shaped elements of said connecting members move upwardly along an arc-shaped path, thus engaging the heads of the locking pins and lifting said locking pins so as to disengage them from the apertures of the corresponding lower rail.

As the fork-shaped elements of the connecting members move along an arc-shaped path, the locking pins will move along an arc-shaped path as well, which can entail remarkable problems.

First of all, during their movement the locking pins may get stuck against the edge of the respective apertures of the lower rails, thus causing jamming of the respective locking assembly.

Secondly, due to the movement along an arc-shaped path, the length of the stroke of the locking pins is limited, which gives a little margin for guaranteeing that the locking pins correctly move out of the apertures of the lower rails when actuated by the connecting members of the release assembly.

Thirdly, when designing the locking arrangement, enough room has to be provided for the rotational movement of the connecting members and of the locking pins.

These problems are worsened by the fact that the fork-shaped elements of the connecting members engage the locking pins at their heads, i.e. at the opposite end with respect to the tip penetrating into the apertures of the lower rails.

Therefore, a main object of the present invention is to provide a sliding device for a vehicle seat provided with an improved releasing assembly allowing to obtain a locking arrangement having a compact overall structure.

A further object of the present invention is to provide a sliding device for a vehicle seat provided with an improved releasing assembly showing an improved reliability, namely avoiding the risk of jamming of the locking pins when they are moved from their locking configuration to their unlocking configuration, and vice versa.

These and other objects are achieved by a sliding device as claimed in the appended claims.

SUMMARY OF THE INVENTION

The invention relates to sliding device for a vehicle seat which comprises a pair of parallel tracks, each including a lower rail and an upper rail slidably mounted to said lower rail, each lower rail comprising a plurality of apertures, aligned and preferably equally spaced from one another along the longitudinal axis of said lower rail.

The sliding device further comprises a locking arrangement which comprises a locking assembly associated to each track for selectively allowing/preventing a movement of said upper rails relative to said lower rails. Each locking assembly is connected to a respective upper rail and comprises one or more locking pins configured to penetrate into corresponding apertures of the respective lower rail and to engage the edges of said apertures, said locking pins being biased to a locking configuration, for instance by spring means.

The locking arrangement is further provided with a releasing assembly for simultaneously switching said locking assemblies from a locking configuration, in which the movement of the upper rails of the tracks relative to the respective lower rails is prevented, to an unlocking configuration, in which the movement of said upper rails relative to the respective lower rails is allowed.

Said releasing assembly comprises a releasing member and a pair of connecting members, one for each locking assembly, each of said connecting members being in a force transmission connection with the releasing member, on one hand, and with the locking pins of the respective locking assembly, on the other hand.

Accordingly, when a user applies a force to the releasing member, such force is transmitted from the releasing member to the connecting members, and from said connecting members to the locking pins of the respective locking assembly, thus driving said locking pins from their locking configuration to their unlocking configuration.

According to the invention, the releasing assembly comprises:
- a releasing member comprising a pair of substantially parallel arms, each of said arms being pivotally connected to a respective track;
- a crossbar extending transversely to the tracks of the sliding device and provided at each end with an engaging assembly for engaging the locking pins of the respective locking assembly; and
- a pair of connecting members, one for each track of the sliding device, each of said connecting members being configured to convert a rotational movement of the end portion of the respective arm of the releasing member into a translational movement of the crossbar.

The aforesaid releasing member is preferably made as a "U"-shaped handle or towel bar, comprising a middle, transverse portion connecting the releasing member arms.

According to the invention, when the middle, transverse portion of the releasing member is pulled upwards, the end portions of the arms of the releasing member rotate downwards and the connecting members covert this rotational movement into a translational movement of the crossbar, namely into an upwardly oriented translational movement of said crossbar, which lifts the locking pins of the locking assemblies, thus disengaging them from the apertures of the lower rails (unlocking configuration).

When the middle, transverse portion of the releasing member is released, the springs biasing the locking pins are free to push said locking pins downwards, back into the apertures of the lower rails (locking configuration). As a consequence, the crossbar moves downwards, too, and the connecting members covert this translational movement into an upward, rotational movement of the end portions of the arms of the releasing member; as a result, the middle, transverse portion of the releasing member moves downwards, back to its initial position.

Thanks to the translational movement of the crossbar and, as a consequence, of the locking pins, the risk that the locking pins get stuck against the edge of the apertures of the lower rails is avoided, thus avoiding the risk of jamming of the locking assemblies.

Moreover, the length of the stroke of the locking pins may be increased with respect to traditional locking arrangements, thus ensuring a correct disengagement of the locking pins from the apertures of the lower rails.

In addition, as the crossbar and the locking pins move along a substantially vertical direction, the overall room that is to be provided when designing the locking arrangement is reduced with respect to traditional locking arrangements.

Furthermore, the rigid crossbar connecting the locking assemblies of the tracks to each other helps to ensure that such locking assemblies are perfectly aligned with each other in the direction of the longitudinal axes of the tracks.

According to a preferred embodiment of the invention, each locking assembly comprises one or more locking pins which are provided with at least one transversely projecting peg, preferably with two diametrically opposed transversely projecting pegs.

Each of the engaging assemblies provided at the ends of the crossbar correspondingly comprises an engaging plate provided with a window having a width larger than the width (diameter) of the locking pins but smaller than the sum of the width (diameter) of the locking pins and the length of the projecting pegs, and the transversely projecting pegs are arranged on the respective locking pins so that they are substantially in abutment against such engaging plate when the locking pins are completely inserted in the apertures of the lower rails.

Thanks to this construction, the edge of the window of the engaging plate can engage such pegs for lifting the locking pins and driving them to their unlocking configuration. According to an embodiment of the invention, the size of the locking pins, the distance between said locking pins, the size of the apertures in the lower rails and the distance between said apertures are chosen so that, for any position of the upper rails relative to the lower rails, at least one locking pin—and preferably at least two locking pins—is always aligned with a corresponding aperture, so that it can penetrate into said aperture and engage the edge thereof.

According to an alternative, preferred embodiment of the invention, the size of the locking pins, the distance between said locking pins, the size of the apertures in the lower rails and the distance between said apertures are chosen so that, for any position of the upper rails relative to the lower rails, all the locking pins penetrate into respective apertures of the lower rails and engage the edges thereof.

BRIEF DESCRIPTION OF THE DRAWINGS

Further features and advantages of the invention will become more evident from the detailed description of some preferred embodiments thereof, given by way of non limiting example, with reference to the attached drawing, in which:

FIG. 5b is an enlarged view showing the detail of the releasing assembly of FIG. 5a in in a second, unlocking configuration.

DETAILED DESCRIPTION OF PREFERRED EMBODIMENTS OF THE INVENTION

Figure 1:
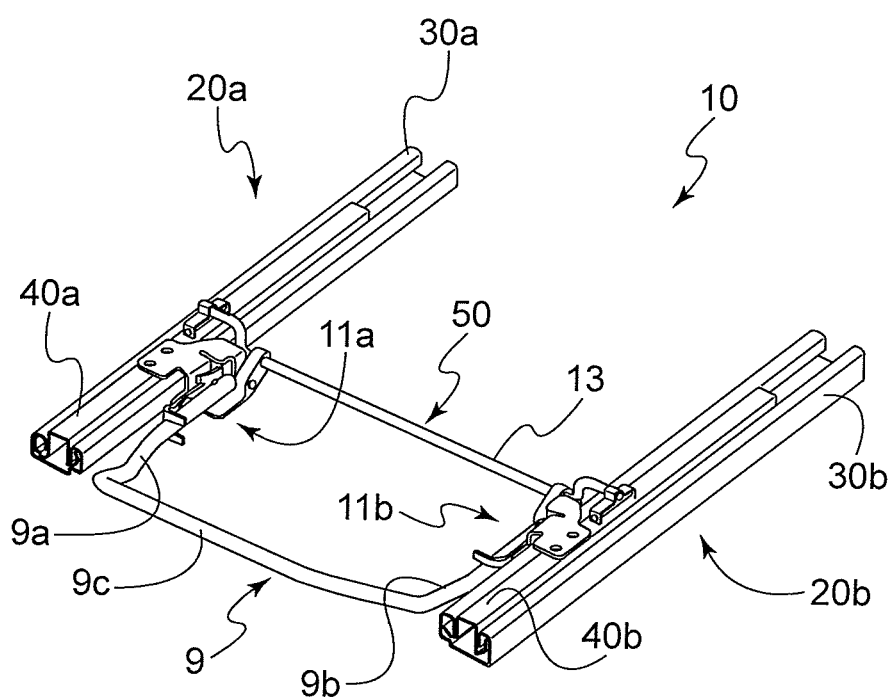
FIG. 1 is a perspective view of a sliding device according to a first embodiment of the invention.

With reference to FIG. 1, a sliding device 10 according to a first preferred embodiment the invention is shown.

In a per se known manner, the sliding device 10 comprises a pair of parallel tracks 20a, 20b, each comprising a lower rail 30a, 30b, intended to be attached to the vehicle floor, and an upper rail 40a, 40b, intended to be attached to the frame of a vehicle seat.

Each upper rail 40a, 40b is constrained to the respective lower rail 30a, 30b, but can slide relative to said lower rail.

In order to selectively allow/prevent a sliding movement of the upper rails relative to the lower rails of the tracks 20a, 20b, a locking arrangement is provided. Said locking arrangement comprises two locking assemblies, one for each tracks 20a, 20b.

As will be shown below, each locking assembly comprises one or more locking pins, bound to the respective upper rail and configured to penetrate into apertures provided in the respective lower rail for locking the upper rails to the lower rails and preventing any movements of said upper rails relative to said lower rails.

In order to allow a user to adjust the position of the seat relative to the vehicle floor, the locking arrangement of the sliding device according to the invention also comprises a releasing assembly 50 for moving the locking pins from the aforesaid locking configuration to an unlocking position, in which all the locking pins are extracted from the apertures of the respective lower rail, thus allowing the upper rails to slide relative to the lower rails.

In general, the releasing assembly comprises a releasing member 9 and a pair of connecting members 11a, 11b, one for each locking assembly, each connecting member being in a force transmission connection with the releasing member 9, on one hand, and with the locking pins of the respective locking assembly, on the other hand.

According to the invention, the releasing assembly 50 comprises:

a releasing member 9 comprising a pair of substantially parallel arms 9a, 9b, each of said arms being pivotally connected to a respective track 20a, 20b;

a crossbar 13 extending transversely to the tracks 20a, 20b of the sliding device and provided at each end with an engaging assembly for engaging the locking pins of the respective locking assembly; and a pair of connecting members 11a, 11b, one for each track 20a, 20b of the sliding device, each of said connecting members being configured to convert a rotational movement of the end portion of the respective arm of the releasing member into a translational movement of the crossbar.

In the shown embodiment, the releasing member is made as a "U"-shaped releasing handle or towel bar 9 and comprises a middle gripping portion 9c joining the substantially parallel arms 9a, 9b.

Figure 2A:
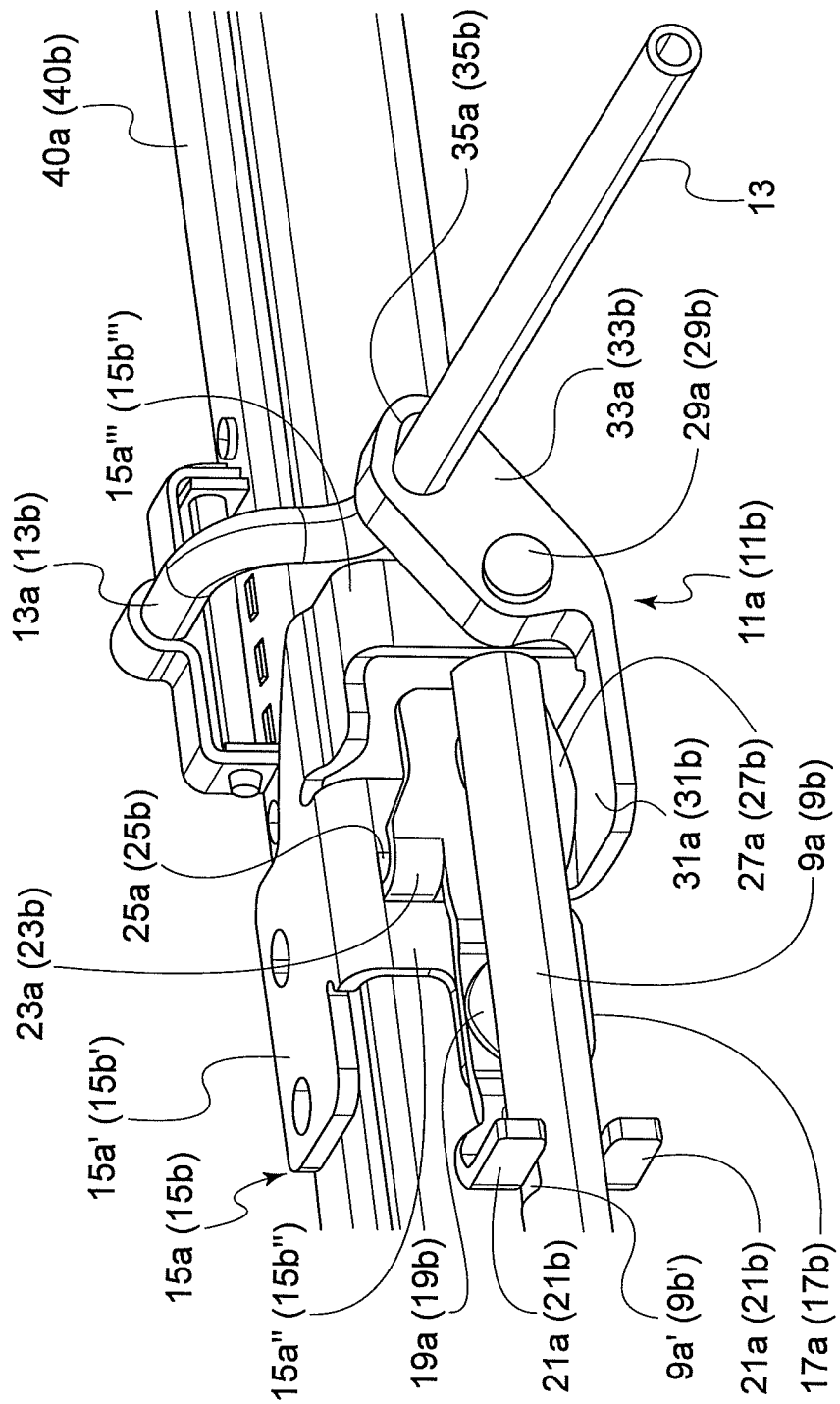
FIG. 2a is an enlarged view showing a detail of the releasing assembly of the sliding device of FIG. 1 in a first, locking configuration.
Figure 2B:
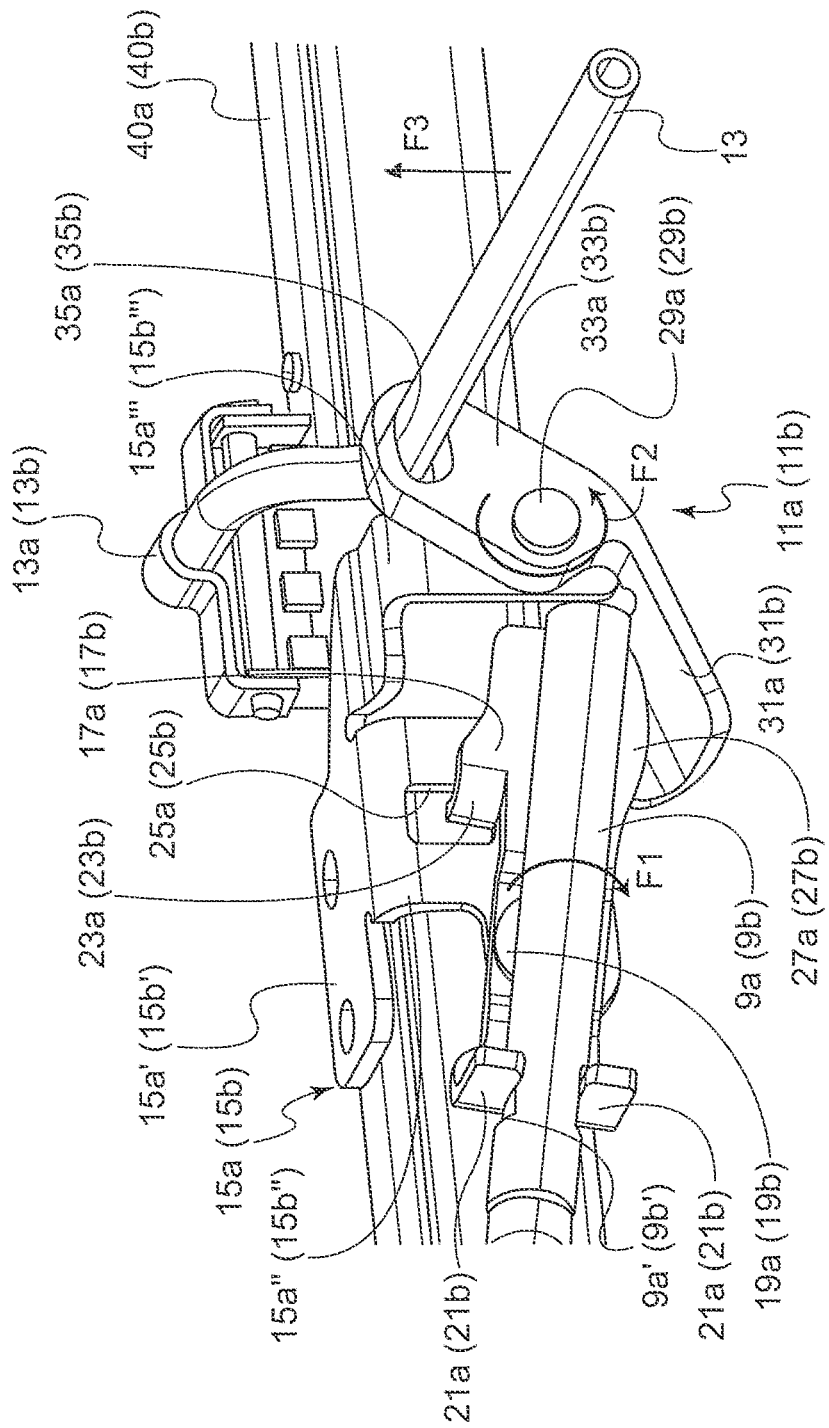
FIG. 2b is an enlarged view showing the detail of the releasing assembly of FIG. 2a in a second, unlocking configuration.
Figure 3A:
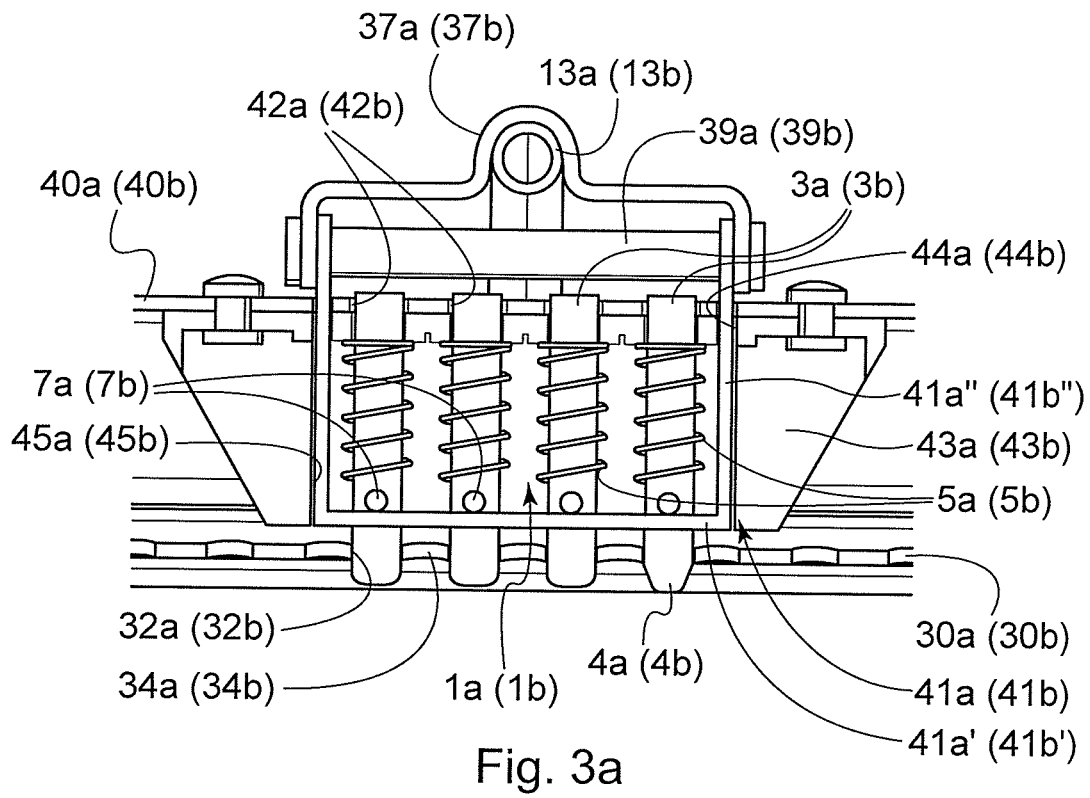
FIG. 3a is an enlarged view showing one of the locking assemblies of the sliding device of FIG. 1 in a first, locking configuration.
Figure 3B:
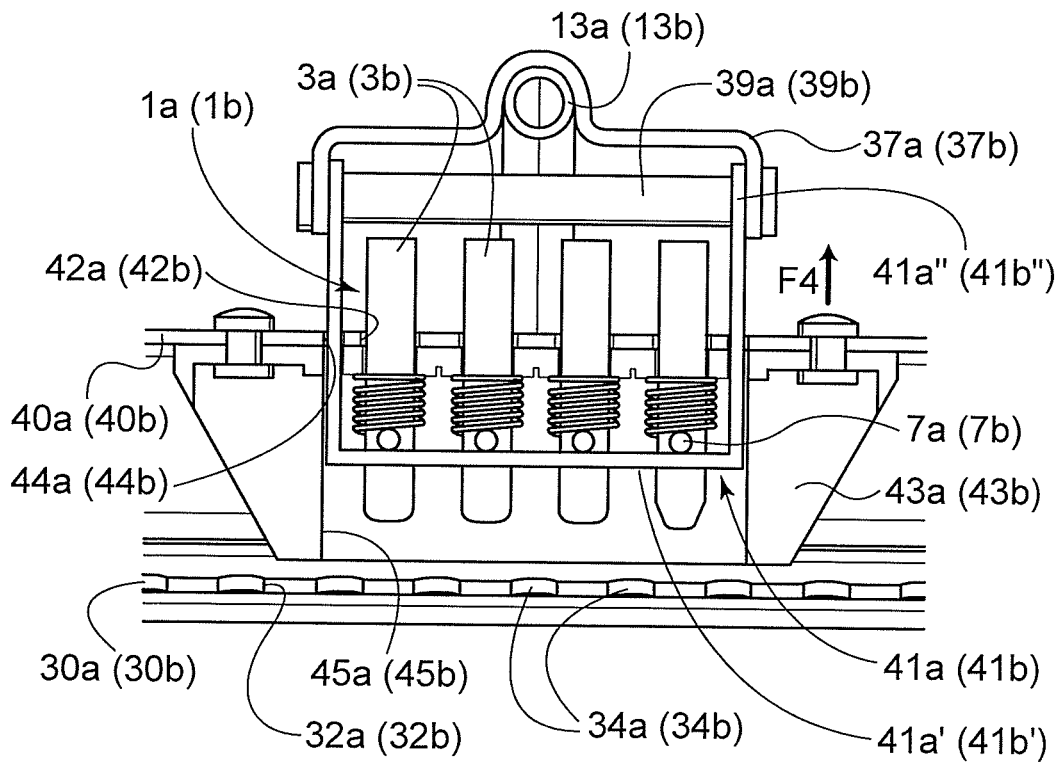
FIG. 3b is an enlarged view showing the locking assembly of FIG. 3a in a second, unlocking configuration.

One of the connecting members of the releasing assembly of the sliding device according to the first preferred embodiment of the invention is shown in greater detail in FIGS. 2a, 2b and the corresponding locking assembly is shown in greater detail in FIGS. 3a, 3b. It is to be intended that the other connecting member and the other locking assembly are, respectively, identical to the ones shown in FIGS. 2a, 2b and 3a, 3b.

As shown in FIGS. 2a, 2b, for each track of the sliding device the releasing assembly 50 is provided with a mounting support 15a, 15b which is fastened to the respective upper rail 40a, 40b and to which both the releasing member arm 9a, 9b and the connecting member 11a, 11b are pivotally connected.

In the shown embodiment, the mounting support 15a, 15b includes a fastening portion 15a', 15b' for the connection to the upper rail, which fastening portion is substantially parallel to the upper surface of the upper rail and lies on said upper surface of the upper rail. The mounting support further comprises a first and second wings 15a", 15b" and 15a''', 15b''', respectively, which extend from the fastening portion 15a', 15b' along a side surface (preferably the inner side surface, as shown in the Figures) of said upper rail. The releasing member arm 9a, 9b and the connecting member 11a, 11b are pivotally connected to the mounting support 15a, 15b at said first and second wings 15a", 15b" and 15a''', 15b''', respectively.

For pivotally connecting the releasing member arm to the mounting support, a releasing member plate 17a, 17b is pivotally connected to the mounting support 15a, 15b by means of a first pivot pin 19a, 19b and the end portion of the releasing member arm 9a, 9b is constrained to the releasing member plate 17a, 17b by a pair of bent tabs 21a, 21b engaging on either sides a flattened section 9a', 9b' of the end portion of the releasing member arm 9a, 9b.

The range of pivoting of the releasing member plate 17a, 17b about the first pivot pin 19a, 19b is restrained by a hooked tab 23a, 23b which is received in a window 25a, 25b provided in the mounting support 15a, 15b, namely in the first wing 15a", 15b" of said mounting support: in a first limit position of the releasing member plate, the hooked tab 23a, 23b abuts against a first edge of the window 25a, 25b (see FIG. 2a), while in a second limit position of the releasing member plate, the hooked tab 23a, 23b abuts against a second, opposite edge of the window 25a, 25b (see FIG. 2b). Therefore, the size of the window 25a, 25b determines the pivoting range of the releasing member plate 17a, 17b about the first pivot pin 19a, 19b.

The releasing member plate 17a, 17b further includes a driving surface 27a, 27b for establishing a force transmission connection between the releasing member arm 9a, 9b and the respective connecting member 11a, 11b.

Such connecting member 11a, 11b is pivotally connected to the mounting support 15a, 15b, namely to the second wing 15a''', 15b''' of said mounting support, by means of a second pivot pin 29a, 29b.

The connecting member 11a, 11b includes a connecting member bracket 31a, 31b, intended to be in contact with driving surface 27a, 27b of the releasing member plate 17a, 17b and offering a driven surface for said driving surface 27a, 27b.

It will be evident to the person skilled in the art that the profiles of the driving surface 27a, 27b of the releasing member plate 17a, 17b and of the connecting member bracket 31a, 31b of the connecting member can be adequately chosen for obtaining the desired force transmission connection between the releasing member and the connecting member.

On the side of the second pivot pin opposite to the connecting member bracket 31a, 31b, the connecting member 11a, 11b is provided with a crossbar engaging portion 33a, 33b, which is provided with an elongated slot 35a, 35b through which the crossbar 13 passes.

Thanks to the provision of the elongated slot 35a, 35b, upon rotation of the connecting member 11a, 11b about the second pivot pin 29a, 29b, the crossbar 13 is driven along the walls of said elongated slot so that it moves along a substantially linear path, namely along to a vertically oriented linear path.

The end 13a, 13b of the crossbar 13 is provided with an engaging assembly for engaging the respective locking assembly and establishing a force transmission connection between the releasing member 11a, 11b and said locking assembly.

As shown in FIGS. 3a, 3b, each locking assembly 1a, 1b comprises one or more locking pins 3a, 3b (four in the shown embodiment), which are configured to pass through apertures 42a, 42b provided in the respective upper rail 40a, 40b and penetrate into apertures 32a, 32b provided in the respective lower rail 30a, 30b for locking the upper rails to the lower rails and preventing any movements of said upper rails relative to said lower rails.

In the shown embodiment, the locking pins 3a, 3b of the locking assembly and the apertures 32a, 32b of the lower rails are arranged so that, at any position of the upper rails relative to the lower rails, all the locking pins penetrate into respective apertures of the lower rail.

To this purpose, at least one locking pin (so-called "master pin") is provided with a rounded tip 4a, 4b and the webs 34a, 34b between adjacent apertures of lower rail are correspondingly provided with a convex profile in the direction of the longitudinal axis of the lower rail. Furthermore, the apertures 32a, 32b are preferably provided with chamfered edges.

However, in alternative embodiments of the invention, the locking pins of the locking assembly and the apertures of the lower rail could be arranged so that, for any position of the upper rails relative to the lower rails, at least one locking pin—and preferably two locking pins—is aligned to a corresponding aperture of the respective lower rail and penetrate therethrough. A similar arrangement of the locking pins of the locking assembly and of the apertures of the lower rail is disclosed, for instance, in US 2003/006355.

The locking pins 3a, 3b are biased to their locking configuration, in which they penetrate into corresponding apertures of the respective lower rail. To this purpose, a helical spring 5a, 5b is wound around the body of each locking pin 3a, 3b and the upper ends of the helical springs 5a, 5b abut against the edge of corresponding apertures 42a, 42b of the upper rails, thus biasing such locking pins downwards, towards the apertures 32a, 32b of the lower rails.

The crossbar 13 is configured to move along a substantially linear path and to accordingly drive the locking pins 3a, 3b along a substantially linear path for moving such locking pins from their locking configuration to their unlocking configuration.

To this purpose, the end 13a, 13b of the crossbar 13 is provided with an engaging assembly comprising a yoke 37a, 37b, a stud 39a, 39b arranged between opposite ends of the yoke 37a, 37b and a "U" shaped engaging plate 41a, 41b arranged between the respective upper and lower rails and provided with a window through which the locking pins 3a, 3b are configured to pass.

In detail, the engaging plate 41a, 41b comprises a middle portion 41a', 41b' provided with the window through which the locking pins are configured to pass and two upwardly extending legs 41a'', 41b'' which pass through corresponding holes 44a, 44b provided in the upper rail and are connected to the stud 39a, 39b.

In order to allow the locking pins 3a, 3b to be driven by engaging plate 41a, 41b, such locking pins are provided with transversely projecting pegs 7a, 7b. Preferably, each locking pin 3a, 3b is provided with two diametrically opposed transversely projecting pegs 7a, 7b.

Said transversely projecting pegs 7a, 7b are arranged on the body of the locking pins 3a, 3b so that they are substantially in abutment against the engaging plate 41a, 41b when said locking pins are completely inserted in the apertures 32a, 32b of the lower rails 30a, 30b (locking configuration, see FIG. 3a).

Correspondingly the window of the engaging plate 41a, 41b is designed so that its width is larger than the width of the locking pins 3a, 3b, but smaller than the sum of the width of said locking pins and of the length of the transversely projecting pegs 7a, 7b, so that the edge of this window can engage the transversely projecting pegs 7a, 7b and lifting the locking pins 3a, 3b until they become disengaged from the apertures 32a, 32b of the lower rails 30a, 30b.

As can be seen in the Figures, in order to enhance the stiffness of the construction, a cage block 43a, 43b is fixedly fastened to the upper rail 40a, 40b and the engaging plate 41a, 41b slides inside said cage block, along the walls 45a, 45b of a cavity provided to this purpose in the cage block.

Thanks to such a rigid construction, it can be guaranteed that the locking pins can be properly driven along a substantially rectilinear path.

The operation of the locking arrangement of the sliding device according to the invention can be summarized as follows.

In a rest condition, the springs 5a, 5b bias the locking pins 3a, 3b of the locking assemblies 1a, 1b towards the apertures 32a, 32b of the lower rails 30a, 30b and said locking pins penetrate into corresponding apertures of the respective lower rail. In such a locking configuration, the upper rails 40a, 40b cannot slide relative to the lower rails 30a, 30b.

When a user wishes to adjust the position of the vehicle seat relative to the vehicle floor, he/she pulls the middle portion 9c of the releasing member 9 upwardly. As a result, the end portions of the releasing member arms 9a, 9b pivot in a clockwise direction (see arrow F1 in FIG. 2b) about the first pivot pin and the driving surfaces 27a, 27b of the releasing member plates 17a, 17b act upon the driven surfaces of the connecting member brackets 31a, 31b of the connecting members 11a, 11b, thus causing a rotation in a counterclockwise direction of said connecting members 11a, 11b about the second pivot pin (see arrow F2 in FIG. 2b). Upon rotation of the connecting members, the crossbar 13 moves upwards (see arrow F3 in FIG. 2b) sliding along the elongates slots 35a, 35b of said connecting members.

As the crossbar 13 moves upwards, the engaging plates 41, 41b are pulled upwards (see arrow F4 in FIG. 3b).

As the engaging plates 41a, 41b move upwards, the edges of the windows of said engaging plates engages the transversely projecting pegs 7a, 7b of the locking pins 3a, 3b and, by overcoming the elastic resistance of the springs 5a, 5b, push upwards said locking pins 3a, 3b along a substantially linear path until they become disengaged from the apertures 32a, 32b of the respective lower rail 30a, 30b.

In such an unlocking configuration, the upper rails 40a, 40b can slide relative to the lower rails 30a, 30b and the position of the vehicle seat can be adjusted.

When the user releases the releasing member 9, the springs 5a, 5b biases the locking pins 3a, 3b back towards the apertures of the respective lower rail 30a, 30b, and said locking pins penetrate into corresponding apertures of said lower rail, thus blocking the upper rail relative to the lower rail in a new, desired position.

As a result, the crossbar 13 moves downwards back to its starting position and makes the connecting members 11a, 11b rotate in a clockwise direction back to their initial position. The rotation of the connecting members 11a, 11b entails a rotation of the releasing member arms in a counterclockwise direction, so that the releasing member 9, too, is brought back to its initial position.

Figure 4:
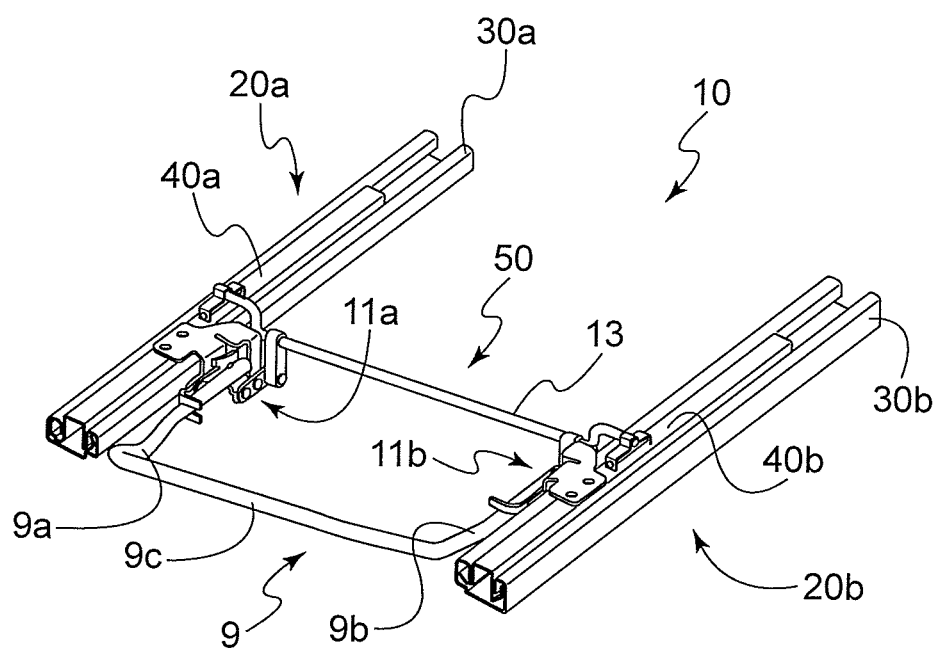
FIG. 4 is a perspective view of a sliding device according to a second embodiment of the invention.
Figure 5A:
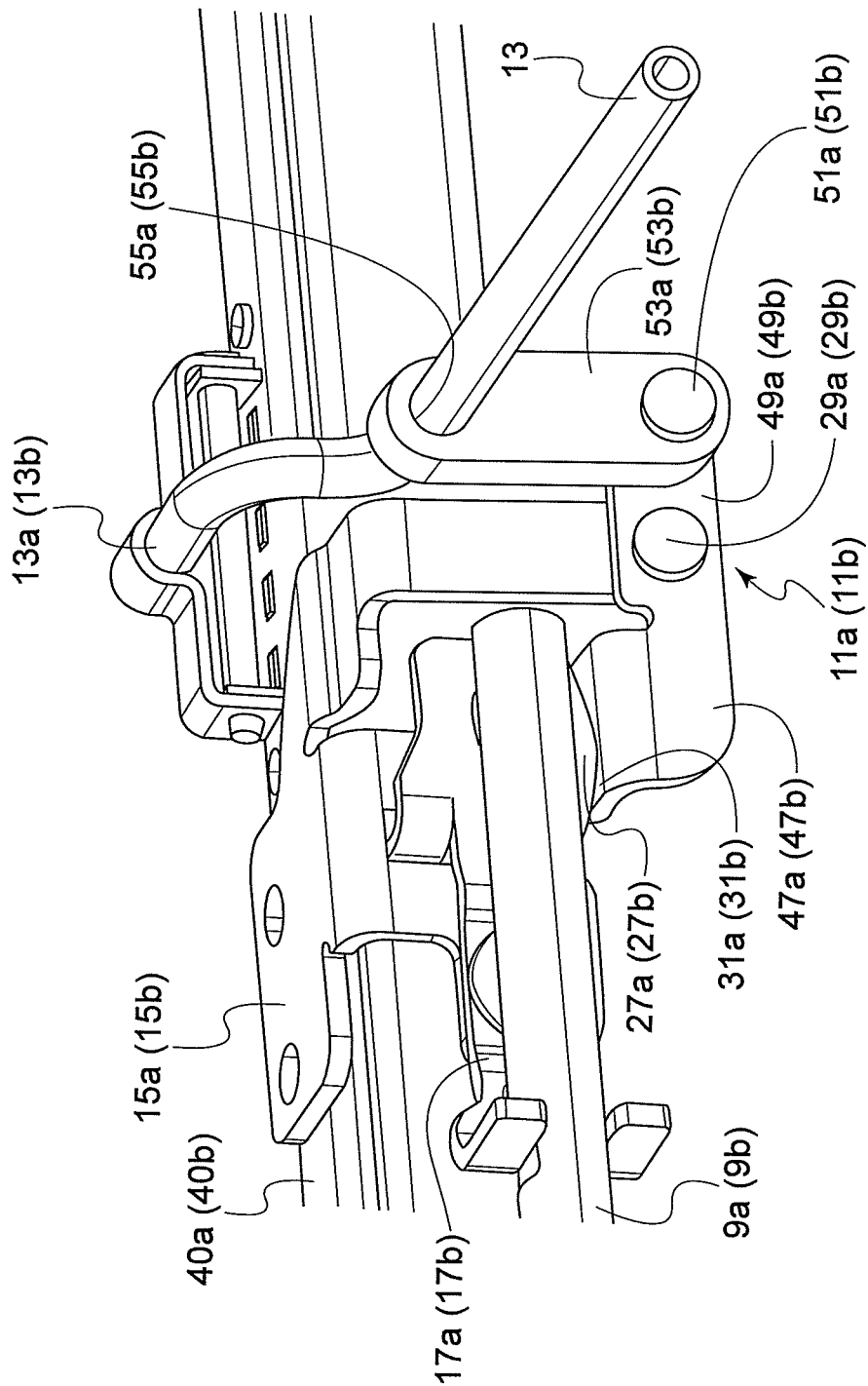
FIG. 5a is an enlarged view showing a detail of the releasing assembly of the sliding device of FIG. 4 in a first, locking configuration.

Referring now to FIGS. 4, 5a and 5b, a second embodiment of the invention is schematically shown.

The construction of the sliding device and of its releasing assembly according to this second embodiment is similar to the one of the previously described embodiment and parts having the same structure and/or function are denoted by the same numerals used in FIGS. 1, 2a and 2b.

The second embodiment differs from the first embodiment in the structure of the connection between the connecting members 11a, 11b and the crossbar 13.

As clearly visible in FIGS. 5a and 5b, each connecting member 11a, 11b is made as rocker, with first and second rocker arms on opposite sides of the second pivot pin 29a, 29b.

A first rocker arm 47a, 47b carries the connecting member bracket 31a, 31b, which is in force transmission connection with the releasing member plate 17a, 17b, while the second rocker arm 49a, 49b is connected, by means of a pin 51a, 51b, to a push rod 53a, 53b. The push rod 53a, 53b is provided with a through-hole 55a, 55b through which the crossbar 13 passes.

It will be evident to the person skilled in the art that also according to the structure of this second embodiment of the invention, upon rotation of the connecting members 11a, 11b about the second pivot pin 29a, 29b, the crossbar 13 will move along a linear path, namely a vertically oriented linear path.

It will be also evident to the person skilled in the art that the above description of preferred embodiments of the invention has been given merely by way of example and several variants and modifications within the reach of the person skilled in the art can be envisaged, without departing form the scope of the invention as defined by the appended claims.

The invention claimed is:

1. A sliding device for a vehicle seat, the sliding device comprising a pair of parallel tracks, each of the tracks comprising a lower rail and an upper rail, each of the upper rails being constrained to a respective one of the lower rails, but slidable relative to the respective one of the lower rails, each of the upper rails having a longitudinal axis, each of the lower rails having a longitudinal axis, wherein the lower rails are each provided with a plurality of apertures arranged along the longitudinal axes of the lower rails, wherein the sliding device is provided with a locking arrangement including two locking assemblies, wherein each of the locking assemblies is provided for a respective one of the tracks, wherein each of the locking assemblies comprises one or more locking pins configured to penetrate into respective one or more apertures of the plurality of apertures of the lower rail of the respective one of the tracks, wherein the locking arrangement further comprises a releasing assembly for moving the one or more locking pins of each of the locking assemblies from a locking configuration to an unlocking configuration, wherein the releasing assembly comprises:

a releasing member being made as a U-shaped releasing handle or a U-shaped towel bar, the releasing member comprising a pair of substantially parallel releasing member arms and a middle, transverse portion joining the releasing member arms, each of the releasing member arms being pivotally connected to a respective one of the tracks, the releasing member configured to convert an upwardly oriented movement of the middle, transverse portion of the releasing member into a rotational movement of an end portion of each of the releasing member arms;

a crossbar extending transversely to the tracks and being provided at each of opposite ends with an engaging assembly for engaging the one or more locking pins of a respective one of the locking assemblies; and a pair of connecting members, each of the connecting members being provided for a respective one of the tracks, each of the connecting members being configured to convert the rotational movement of the end portion of a respective one of the releasing member arms into a vertical, upwardly oriented translational movement of the crossbar.

2. The sliding device according to claim 1, wherein each of the tracks is provided with a mounting support, wherein each of the mounting supports is fastened to a respective one of the upper rails, wherein each of the releasing member arms is pivotally connected to a respective one of the mounting supports, and wherein each of the connecting members is pivotally connected to a respective one of the mounting supports.

3. The sliding device according to claim 2, wherein the releasing assembly comprises a pair of releasing member plates, wherein each of the releasing member plates is pivotally connected to a respective one of the mounting supports, and wherein the end portion of each of the releasing member arms is constrained to a respective one of the releasing member plates.

4. The sliding device according to claim 3, wherein each of the releasing member plates is provided with a hooked tab received in a window of the respective one of the mounting supports for limiting a pivoting range of the releasing member arms relative to the mounting supports.

5. The sliding device according to claim 3, wherein each of the releasing member plates includes a driving surface, and wherein each of the connecting members has a driven surface in a force transmission connection with the driving surface of a respective one of the releasing member plates.

6. The sliding device according to claim 5, wherein each of the connecting members is pivotally connected to the respective one of the mounting supports by means of a pivot pin, wherein each of the connecting members comprises, on a first side of the pivot pin, a connecting member bracket including the driven surface, and, on a second, opposite side of the pivot pin, a crossbar engaging portion provided with an elongated slot, and wherein the crossbar passes through the elongated slot of the crossbar engaging portion of each of the connecting members.

7. The sliding device according to claim 5, wherein each of the connecting members is pivotally connected to the respective one of the mounting supports by means of a pivot pin, wherein each of the connecting members is made as a rocker, with a first rocker arm, arranged on a first side of the pivot pin and carrying a connecting member bracket including the driven surface, and a second rocker arm, arranged on a second, opposite side of the pivot pin and connected to a respective one of push rods, wherein each of the push rods is provided with a through-hole, and wherein the crossbar passes through the through-hole of each of the push rods.

8. The sliding device according to claim 1, wherein each of the engaging assemblies includes a yoke fastened to a respective one of the ends of the crossbar, a stud arranged between opposite ends of the yoke, and a U-shaped engaging plate connected to the stud and configured to engage the one or more locking pins of a respective one of the locking assemblies.

9. The sliding device according to claim 8, wherein each of the engaging plates is provided with a window, and wherein the one or more locking pins of each of the locking assemblies are configured to pass through the window of a respective one of the engaging plates.

10. The sliding device according to claim 9, wherein each of the one or more locking pins of each of the locking assemblies is provided with at least one transversely projecting peg.

11. The sliding device according to claim 10, wherein each of the windows permits the one or more locking pins of a respective one of the locking assemblies to pass therethrough, and wherein each of the windows has a width larger than a width of any one of the one or more locking pins of the respective one of the locking assemblies.

12. The sliding device according to claim 11, wherein each of the at least one transversely projecting peg of each of the one or more locking pins of each of the locking assemblies has a length and is arranged on a body of a respective one of the one or more locking pins of a respective one of the locking assemblies, and wherein the length of the at least one transversely projecting peg of each of the one or more locking pins of each of the locking assemblies plus the width of the respective one of the one of more locking pins of the respective one of the locking assemblies is larger than the width of the window of a respective one of the engaging plates such that the at least one transversely projecting peg of each of the one or more locking pins of each of the locking assemblies abuts against the respective one of the engaging plates when the one or more locking pins of each of the locking assemblies are completely inserted in the respective one or more apertures of the plurality of apertures of the lower rail of the respective one of the tracks.

13. The sliding device according to claim 8, wherein each of the tracks includes a cage block fixedly fastened to a respective one of the upper rails, wherein each of the cage blocks is provided with a cavity having cavity walls, and wherein each of the engaging plates is slidable inside a respective one of the cage blocks, along the cavity walls of the cavity provided in the respective one of the cage blocks.

14. The sliding device according to claim 1, wherein the one or more locking pins of each of the locking assemblies are biased towards the respective one or more apertures of the plurality of apertures of the lower rail of the respective one of the tracks by means of springs.

* * * * *